(12) United States Patent
Shigemizu et al.

(10) Patent No.: US 6,750,629 B2
(45) Date of Patent: Jun. 15, 2004

(54) INVERTER CONTROL APPARATUS AND MOTOR DRIVING SYSTEM

(75) Inventors: Tetsuro Shigemizu, Nagasaki-ken (JP); Mitsuyuki Nonaka, Nagasaki-ken (JP); Yoshio Kayuki, Nagasaki-ken (JP); Noriyuki Akasaka, Aichi-ken (JP); Osamu Kawabata, Hyogo-ken (JP); Hisanobu Shinoda, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 213 days.

(21) Appl. No.: 09/988,731

(22) Filed: Nov. 20, 2001

(65) Prior Publication Data

US 2003/0094919 A1 May 22, 2003

(51) Int. Cl.[7] .............................. H02P 5/34; H02P 7/42
(52) U.S. Cl. ....................... 318/801; 310/181; 310/199; 318/802; 318/803
(58) Field of Search ......................... 310/181, 198–199, 310/211–212, 266; 318/198, 800–803, 811, 812

(56) References Cited

U.S. PATENT DOCUMENTS 6,313,600 B1 * 11/2001 Hammond et al. ......... 318/798
6,380,655 B1 * 4/2002 Ide et al. .................. 310/211

FOREIGN PATENT DOCUMENTS

JP          11-69880          3/1999

* cited by examiner

*Primary Examiner*—Marlon Fletcher
(74) *Attorney, Agent, or Firm*—Armstrong, Kratz, Quintos, Hanson & Brooks, LLP

(57) ABSTRACT

A motor driving system for driving an induction motor with a rotation frequency detector. The induction motor drives a load, and the rotation frequency detector detects a rotation frequency of the induction motor. The motor driving system includes a variable speed driving unit and an inverter control unit. The variable speed driving unit is connected to the induction motor and has a capacitance at output. The variable speed driving unit rectifies first 3-phase AC power to produce DC power, and converts the DC power into second 3-phase AC power with a frequency, and drives the induction motor with the second 3-phase AC power. The inverter control unit generates a frequency instruction and a temporary current instruction based on the detected rotation frequency and a rotation frequency instruction at least. Then, the inverter control unit corrects the temporary current instruction based on at least one of first correction depending on a value of the capacitance and second correction depending on a predetermined frequency component of the temporary current instruction to produce a current instruction, and controls the variable speed driving unit based on the frequency instruction and the current instruction.

18 Claims, 5 Drawing Sheets

INVERTER CONTROL APPARATUS AND MOTOR DRIVING SYSTEM

BACKGROUND OF THE INVENTION

1. Field of the Invention

The present invention relates to an inverter control apparatus which is used for variable speed drive of a rotary machine, and a motor driving system using the same.

2. Description of the Related Art

FIG. 1 is a block diagram showing the circuit structure of a motor driving system using a conventional inverter control apparatus. A method of changing the frequency of 3-phase AC (alternating current) power Acc supplied to an induction motor is known as one method of controlling rotation speed of the induction motor. The conventional motor driving system is composed of a 3-phase AC power supply 50, an inverter control unit 20, a variable speed driving unit 60, and an induction motor 11 with a rotation frequency detecting unit 12 for a load. The variable speed driving unit 60 is composed of a rectifier 61 and an inverter 62. The variable speed driving unit 60 is used to control the rotation frequency of the induction motor.

The 3-phase AC power supply 50 supplies 3-phase AC power with a constant frequency (60 Hz) to the variable speed driving unit 60. The variable speed driving unit 60 is composed of a rectifying unit 61 and a current type inverter 62. The rectifying unit 61 rectifies the 3-phase AC power into DC power in response to a rectifier current instruction signal Id* from the inverter control unit 20. The current type inverter 62 inverts the DC power into 3-phase AC power Acc in response to an inverter frequency instruction signal fe* from the inverter control unit 20. Thus, the variable speed driving unit 60 controls the frequency of the 3-phase AC power Acc. The 3-phase AC power Acc is supplied to the multi-polar induction motor 11.

The inverter control unit 20 is composed of converters 21 and 22, adders 23 and 26, a speed control section 24, a slide calculating section 25, and a current calculating section 27.

For slide frequency control, a rotation frequency of the multi-polar induction motor 11 (the number of poles is p) is detected by the rotation frequency detecting unit 12 such as an encoder and a signal form indicative of the detected rotation frequency is supplied to the converter 22 of the inverter control unit 20. The converter 22 converts the detected rotation frequency signal form into a 2-pole conversion detected rotation frequency signal fr2 which is supplied to the adders 23 and 26. A multi-polar rotation frequency instruction signal form* is supplied to the converter 21 from the outside, and the converter 21 converts the multi-polar rotation frequency instruction signal form* into a 2-pole conversion rotation frequency instruction signal fr2*, which is supplied to the adder 23.

The adder 23 subtracts the 2-pole conversion detected rotation frequency signal fr2 from the 2-pole conversion rotation frequency instruction signal fr2*, and supplies the subtracting result to the speed control unit 22. The speed control unit 22 generates a 2-pole conversion torque instruction signal T2* from the subtracting result, and supplies to the current calculating section 27 and the slide calculating section 25. The current calculating section 27 calculates the rectifier current instruction signal Id* from the 2-pole conversion torque instruction signal T2* and supplies to the rectifying unit 61 of the variable speed driving unit 60.

The slide calculating section 25 calculates a slide frequency instruction signal Fs* from the 2-pole conversion torque instruction signal T2*. The adder 26 adds the slide frequency instruction signal Fs* and the 2-pole conversion detected rotation frequency signal fr2 to produce the inverter frequency instruction signal fe*, which is supplied to the current type inverter 62 of the variable speed driving unit 60.

In conjunction with the above description, an inverter control apparatus is disclosed in Japanese Laid Open Patent Application (JP-A-Heisei 11-69880). In this reference, an inverter inputs DC power from a DC power supply through a filter capacitor which is provided on the input side of the inverter, and supplies AC power with a variable voltage and a variable frequency to an AC motor to drive the AC motor. A voltage increase suppressing torque instruction correcting section of the inverter control apparatus inputs a capacitor DC voltage applied to the filter capacitor and an operation torque instruction, and outputs a first torque instruction to reduce regenerative torque for suppressing the increase of the DC voltage when the DC voltage increases. A change rate limiting section of the inverter control apparatus limits the change rate of the first torque instruction to output a second torque instruction.

SUMMARY OF THE INVENTION

An object of the present invention is to provide an inverter control apparatus in which the stationary characteristics (such as effective values of voltage and current) of an inverter can be improved, and a motor driving system using the inverter control apparatus.

In an aspect of the present invention, a motor driving system for driving an induction motor with a rotation frequency detector, wherein the induction motor drives a load, and the rotation frequency detector detects a rotation frequency of the induction motor, includes a variable speed driving unit, and an inverter control unit. The variable speed driving unit is connected to the induction motor and has a capacitance at output. The variable speed driving unit rectifies first 3-phase AC power to produce DC power, and converts the DC power into second 3-phase AC power with a frequency, and drives the induction motor with the second 3-phase AC power. The inverter control unit generates a frequency instruction and a temporary current instruction based on the detected rotation frequency and a rotation frequency instruction at least. Then, the inverter control unit corrects the temporary current instruction based on at least one of first correction depending on the capacitance and second correction depending on a predetermined frequency component of the temporary current instruction to produce a current instruction, and controls the variable speed driving unit based on the frequency instruction and the current instruction.

The variable speed driving unit may include a rectifying unit and a current type inverter. The rectifying unit rectifies the first 3-phase AC power in response to the current instruction to produce the DC power. The current type inverter has the capacitance at the output, and inverter converts the DC power into the second 3-phase AC power with the frequency in response to the frequency instruction.

Also, the inverter control unit may include a first correcting section which corrects the temporary current instruction for current flowing into the capacitance in the first correction to produce the current instruction. In this case, the first correcting section may correct the temporary current instruction based on a first correction factor to produce the current instruction. The first correction factor is determined based on the capacitor, a self-inductance of a stator of the induction motor stator, a mutual inductance between the stator and a rotor in the induction motor, a self-inductance of the rotor of the induction motor, a resistance of the stator of the induction motor, a resistance of the rotor of the induction motor rotor, and slide.

Also, the inverter control unit may include a second correcting section which corrects the temporary current instruction based on a second correction factor in the second correction to produce the current instruction, wherein the second correction factor is determined such that the predetermined frequency component is set to a predetermined value.

Also, the inverter control unit may include a first correcting section and a second correcting section. The first correcting section corrects the temporary current instruction for current flowing into the capacitance in the first correction to produce a next temporary current instruction. The second correcting section which corrects the next temporary current instruction based on a second correction factor in the second correction to produce the current instruction, wherein the second correction factor is determined such that the predetermined frequency component is set to a predetermined value. In this case, the first correcting section may correct the temporary current instruction based on a first correction factor to produce the next temporary current instruction. The first correction factor is determined based on the capacitor, a self-inductance of a stator of the induction motor stator, a mutual inductance between the stator and a rotor in the induction motor, a self-inductance of the rotor of the induction motor, a resistance of the stator of the induction motor, a resistance of the rotor of the induction motor rotor, and slide.

In another aspect of the present invention, an inverter control apparatus is for controlling a variable speed driving unit which rectifies first 3-phase AC power to produce DC power, and converts the DC power into second 3-phase AC power with a frequency to drive an induction motor. The inverter control apparatus include a frequency instructing section and a current instructing section. The frequency instructing section generates a torque instruction based on a rotation frequency of the induction motor and a rotation frequency instruction at least and controls the frequency of the second 3-phase AC power based on the torque instruction and the rotation frequency of the induction motor. The current instructing section generates a temporary current instruction from the torque instruction, corrects the temporary current instruction based on a capacitance and an impedance of the induction motor, and controls the variable speed driving unit based on the corrected current instruction, the variable speed driving unit having the capacitance at output connected to the induction motor. In this case, the current instructing section may further correct the corrected current instruction such that a predetermined frequency component of the corrected current instruction is set to a predetermined value.

In still another aspect of the present invention, an inverter control apparatus outputs a control signal to a variable speed driving apparatus which drives an induction motor in a variable speed in response to the control signal. The inverter control apparatus includes a control signal generating section which generates the control signal based on a capacitance at an output terminal set of the variable speed driving apparatus which is connected to the induction motor at the output terminal set.

The control signal is determined based on parameters associated with a rotor and a stator of the induction motor.

Also, the control signal satisfies the following equation:

$$Idc^* = Kc \cdot Id^*$$

where
    $Idc^*$: the control signal,
    $Id^*$: an auxiliary control signal to be outputted as the control signal when the capacitance is not considered,
    $Kc$: a coefficient $Kc$ determined based on a self-inductance of a stator of the induction motor, a mutual inductance between the stator and a rotor of the induction motor, a self-inductance of the rotor of the induction motor, a resistance of the stator of the induction motor, a resistance of the rotor of the induction motor, and a slide quantity.

Also, the control signal generating section may generate the control signal to compensate for a capacitor current flowing into the capacitance.

Also, the control signal generating section generates the control signal based on a frequency instruction signal to instruct a frequency of an output of the variable speed driving apparatus, a self-inductance of a stator of the induction motor, a mutual inductance between the stator and a rotor in the induction motor, a self-inductance of the rotor of the induction motor, a resistance of the stator of the induction motor, a resistance of the rotor of the induction motor, a slide quantity of the induction motor, in addition to the capacitance.

In yet still another aspect of the present invention, an inverter control apparatus outputs a control signal to a variable speed driving apparatus which drives an induction motor in a variable speed in response to the control signal. The inverter control apparatus includes a control signal generating section which generates the control signal based on a frequency component contained in an input signal and a remaining frequency components of the input signal. In this case, the control signal generating section multiplies the input signal and a reciprocal of a ratio of the frequency component to the input signal and generates the control signal based on the multiplication result.

In further another aspect of the present invention, an inverter control apparatus outputs a control signal to a variable speed driving apparatus which drives an induction motor in a variable speed in response to the control signal. The inverter control apparatus includes a capacitor correction signal generating section and a control signal generating section. The capacitor correction signal generating section generates a capacitor correction signal based on a capacitance connected with an output terminal set of the variable speed driving apparatus. The control signal generating section generates the control signal based on an inverter frequency component contained in the capacitor correction signal and a remaining frequency component of the capacitor correction signal other than the inverter frequency component.

In a still further another aspect of the present invention, a motor driving system includes a variable speed driving apparatus which supplies an AC control power generated based on a control signal to an AC motor to drive the AC motor in variable speed, and an inverter control apparatus which outputs the control signal to the variable speed driving apparatus. The variable speed driving apparatus includes a rectification section which rectifies AC power to generate DC power; and an inverter section which generates the AC control power from the generated DC power. The inverter control apparatus generates the control signal based on a capacitance connected with an output terminal set of the variable speed driving apparatus, an inverter frequency component of an input signal and a remaining frequency component of the input signal other than the inverter frequency component, and outputs the control signal to the rectification section.

DESCRIPTION OF THE PREFERRED EMBODIMENTS

Hereinafter, a motor driving system using an inverter control apparatus of the present invention will be described with reference to the attached drawings.

Figure 2:
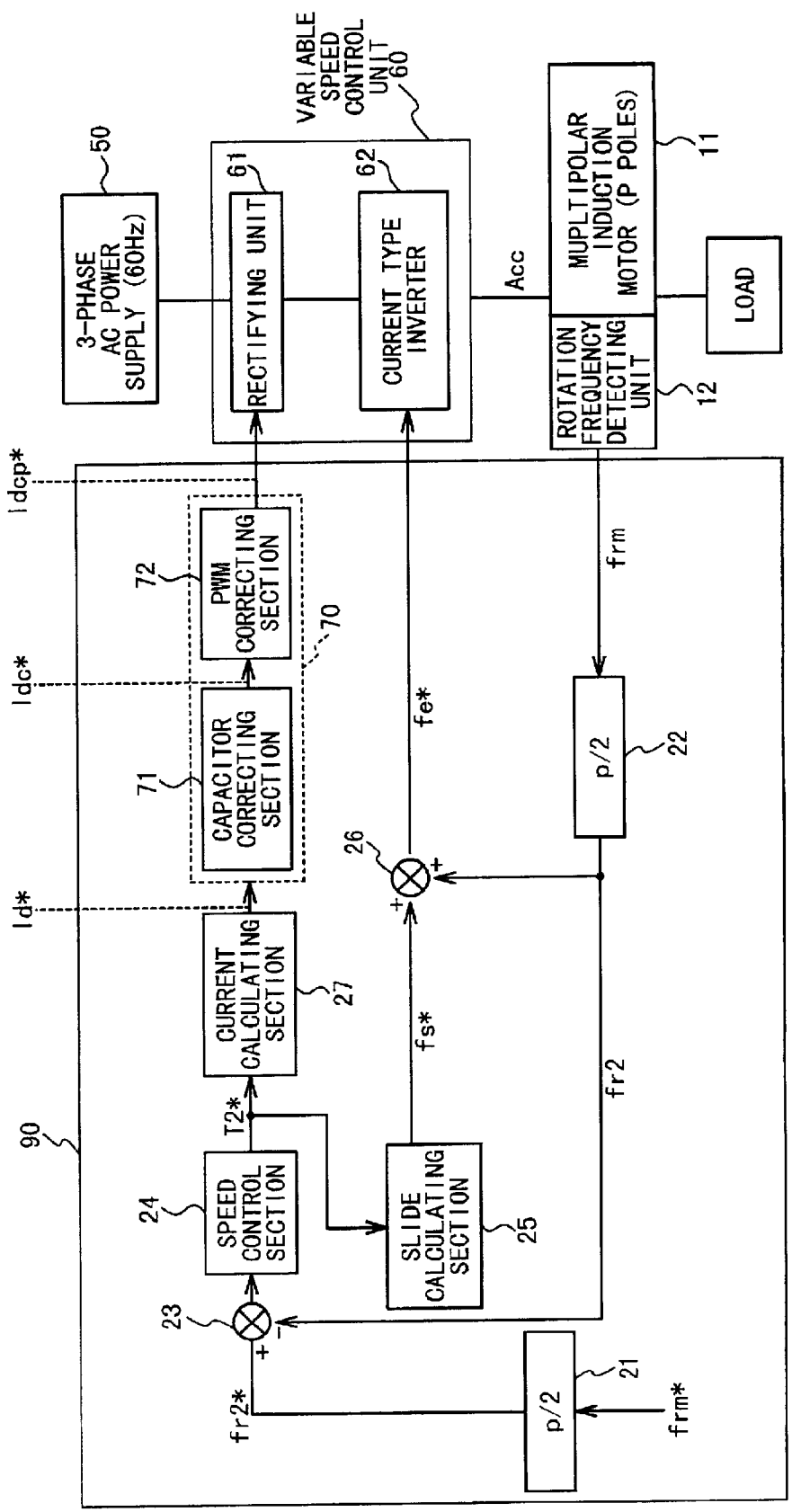
FIG. 2 is a block diagram showing the circuit structure of a motor driving system using an inverter control apparatus according to an embodiment of the present invention.

FIG. 2 is a block diagram showing the circuit structure of a motor driving system using an inverter control apparatus according to an embodiment of the present invention. The motor driving system is composed of a 3-phase AC power supply 50, an inverter control unit 20, a variable speed driving unit 60, a multi-polar induction motor 11 of p poles for a load, and a rotation frequency detecting unit 12 attached to the motor 11.

The 3-phase AC power supply 50 supplies 3-phase AC power with a constant frequency (60 Hz) to the variable speed driving unit 60. The variable speed driving unit 60 is used to control the rotation frequency of the induction motor 11.

Figure 3:
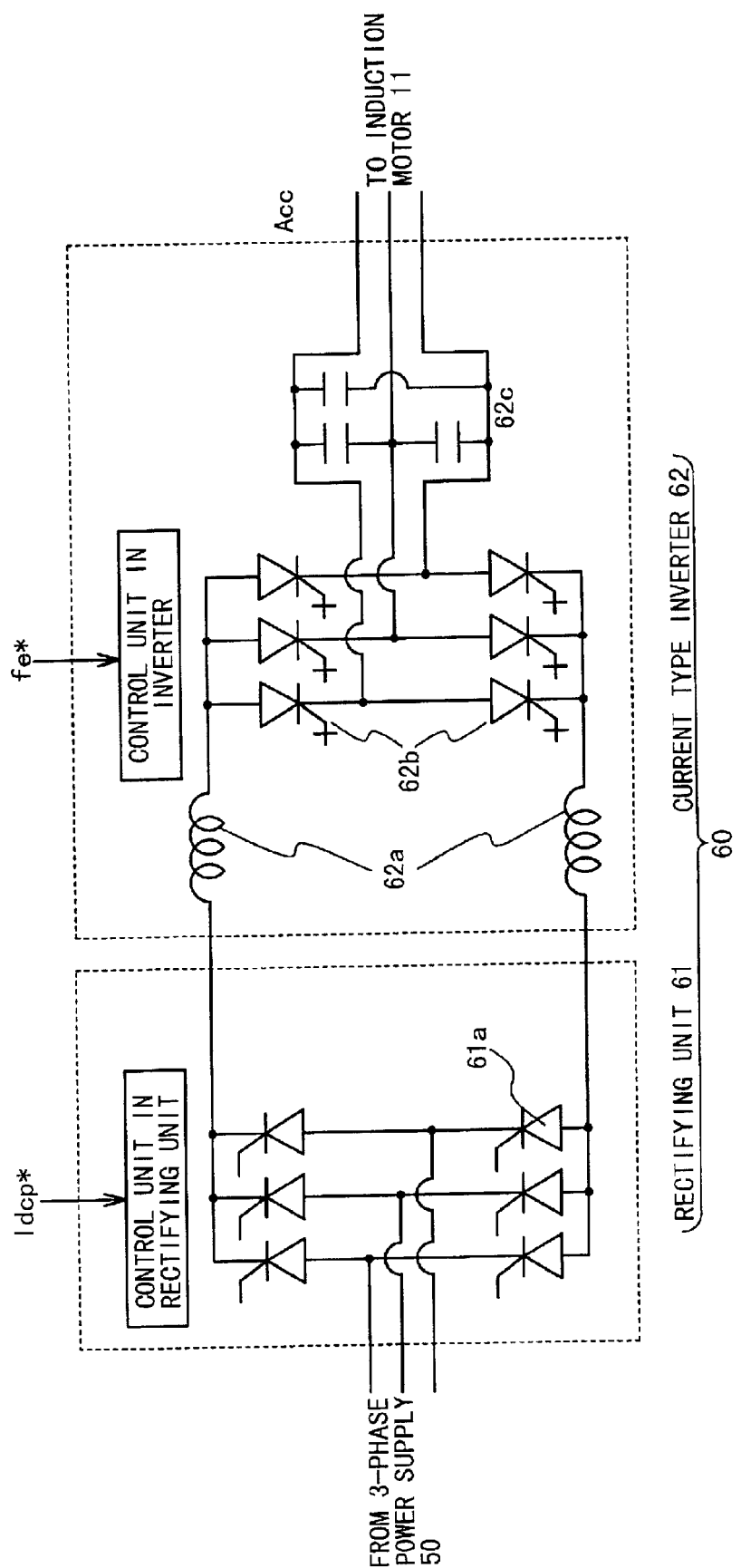
FIG. 3 is a block diagram showing the circuit structure of a variable speed driving unit used in the motor driving system according to the embodiment of the present invention.

As shown in FIG. 3, the variable speed driving unit 60 is composed of a rectifying unit 61 and a current type inverter 62. The rectifying unit 61 is composed of a 3-phase bridge type rectifier of group of devices 61a such as a thyristor, and a control unit. The control unit in the rectifying unit 61 controls the turn-on timing of each of the devices 61a in response to a signal indicative of a rectifier current instruction Idcp* from the inverter control unit 20. The current type inverter is composed of DC reactors (smoothing reactor) 62a connected to the 3-phase bridge type rectifier, a group of self turn-off type devices 62b such as GTOs (gate turn-off thyristor) connected to the reactors 62a, a group of capacitors 62c connected to the group of self turn-off type devices 62b, and a control unit. The group of capacitors 62c is provided at the output of the current type inverter 62. The control unit in the inverter 62 controls the turn-on timing of each of the self turn-off type devices 62b in response to a signal indicative of a rectifier current instruction Idcp* from the inverter control unit 20.

The rectifier 61 rectifies the 3-phase AC power with a constant frequency (60 Hz) from a 3-phase AC power supply 50 into DC power in response to the rectifier current instruction signal Idcp* from the inverter control unit 20. The current type inverter 62 inverts the DC power into 3-phase AC power Acc in response to the inverter frequency instruction signal fe* from the inverter control unit 20. Also, the current type inverter 62 changes the frequency of the 3-phase AC power Acc to control the rotation frequency of the induction motor 11. Thus, the variable speed driving unit 60 controls the frequency of the 3-phase AC power Acc. The 3-phase AC power Acc is supplied to the multi-polar induction motor 11. The rotation frequency of the multi-polar induction motor 11 is detected by the rotation frequency detecting unit 12 such as an encoder and generates a multi-polar detected rotation frequency signal form, which is supplied to the inverter control unit 20.

The inverter control unit 20 is composed of converters 21 and 22, adders 23 and 26, a speed control section 24, a slide calculating section 25, a current calculating section 27, and a correcting section 70 of a capacitor correcting section 71 and a PWM correcting section 72. A multi-polar rotation frequency instruction signal form* is supplied to the converter 21 from the outside.

The converter 22 converts the detected rotation frequency signal form into a signal indicative of 2-pole conversion detected rotation frequency fr2 which is supplied to the adders 23 and 26. Also, the converter 21 converts the multi-polar rotation frequency instruction signal form* into a signal indicative of 2-pole conversion rotation frequency instruction fr2*, which is supplied to the adder 23.

A 2-pole motor model is generally used in the inverter control unit 20. Here, for the simple description, the detected rotation frequency and the rotation frequency instruction signal are converted to have a 2-pole motor format. The 2-pole detected rotation frequency signal form and the 2-pole rotation frequency instruction signal form* are obtained from the following equations (1) and (2).

$$fr2 = frm \times (p/2) \qquad (1)$$

$$fr2^* = frm^* \times (p/2) \qquad (2)$$

where p is the number of poles, fr2 is a 2-pole detected rotation frequency [Hz], form is a multi-polar detected rotation frequency [Hz], fr2* is a 2-pole rotation frequency instruction signal [Hz], and form* is a multi-polar rotation frequency instruction signal [Hz].

The adder 23 subtracts the 2-pole conversion detected rotation frequency signal fr2 from the 2-pole conversion rotation frequency instruction signal fr2*, and supplies the subtracting result to the speed control unit 22. The speed control unit 22 is a PI controller, and the gain is previously determined in accordance with a specification. The speed control unit 22 generates a 2-pole conversion torque instruction signal T2* from the subtracting result using the following equation (3), and supplies to the current calculating section 27 and the slide calculating section 25.

$$T2^* = Kp \times (1 + 1/(sTI)) \times (fr2^* - fr2) \qquad (3)$$

where

T2* is the 2 pole torque instruction signal [Nm],

Kp is a P gain of the PI controller [Nm/Hz],

TI is an I gain of the PI controller [sec], and s is a Laplace transformation operator.

The slide calculating section 25 calculates a slide frequency instruction signal Fs* from the 2-pole conversion torque instruction signal T2*. If a total magnetic flux linkage number effective value Φr on the side of the rotor of the induction motor 11 and a resistance Rr on the side of the rotor of the induction motor 11 are known, the slide calculating section 23 determines a slide frequency instruction value fs* from the following equation (4).

$$fs^* = (Rr \times T2^*)/(\Phi r^2 \times 2\pi) \quad (4)$$

where fs* is a slide frequency instruction signal [Hz],

Rr is the resistance on the side of the induction motor rotor [Ω],

Φr is the total magnetic flux linkage effective value on the side of the induction motor rotor [Wb×T], and T2* is a 2-pole motor conversion torque [Nm].

The adder 26 adds the slide frequency instruction signal Fs* and the 2-pole conversion detected rotation frequency signal fr2 to produce the inverter frequency instruction signal fe*, which is supplied to the current type inverter 62 of the variable speed driving unit 60.

The inverter frequency instruction signal fe* determined from the following equation (5) is sent to the current type inverter 62 of the variable speed driving unit 60 and is used for the control of switches.

$$fe^* = fr2 + fs^* \quad (5)$$

where fe* is an inverter frequency instruction [Hz], and fr2 is a 2-pole detected rotation frequency [Hz].

The current calculating section 27 calculates the rectifier current instruction signal Id* from the 2-pole conversion torque instruction signal T2* and supplies to the correcting section 70. In the current calculating section 25, the calculation of the following equations (6) and (7) is carried out.

$$Ii^* = (Lrr/M) \times ((\Phi r/Lrr)^2 + (T2^*/\Phi r)^2)^{1/2} \quad (6)$$

$$Id^* = (\pi/3\sqrt{2}) \times Ii^* \quad (7)$$

where

Ii* is an inverter current effective value instruction [A],

Id* is a rectifier current instruction [A],

Lrr is a self-inductance on the side of the induction motor rotor [H], and

M is a mutual inductance between the stator and the rotor in the induction motor [H].

Figure 1:
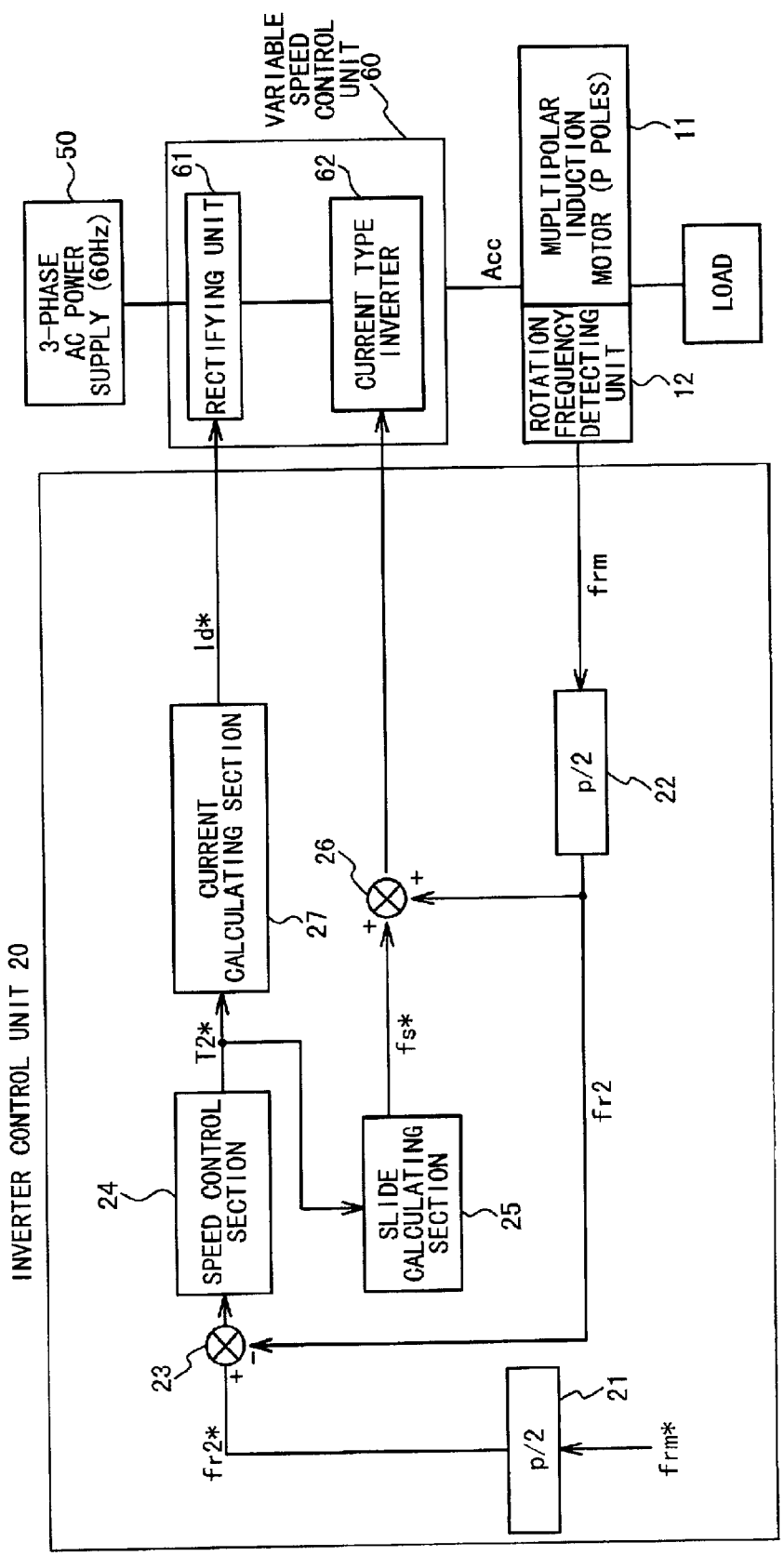
FIG. 1 is a block diagram showing the circuit structure of a motor driving system using a conventional inverter control apparatus.

In the conventional inverter control unit 20 shown in FIG. 1, the control has been carried out without noticing the effect of the capacitors 62c at the output of the current type inverter 62 shown in FIG. 2. Also, the inverter 62 is generally operated in accordance with PWM (pulse width modulation). Therefore, the current waveform includes other frequency components in addition an inverter frequency component.

In this embodiment, the correcting section 70 carries out correction calculation to consider the effect of the capacitors at the output of the current type inverter 62 and the effect of PWM. The control is carried out based on the calculation result. As shown in FIG. 3, in the inverter control unit 90, the capacitor correcting section 71 and the PWM correcting section 72 are provided in back of the current calculating section 25 in series in the order.

The capacitor correction section 71 generates and outputs a capacitor correction rectifier current instruction signal Idc* from the rectifier current instruction signal Id* supplied from the current calculating section 25 to the PWM correcting section 72. The PWM correcting section 72 generates and outputs the correction rectifier current instruction signal Idcp* from the capacitor correction rectifier current instruction signal Idc* to the rectifying unit 61 of the variable speed driving unit 60.

(1) The Capacitor Correcting Section 71

Figure 4:
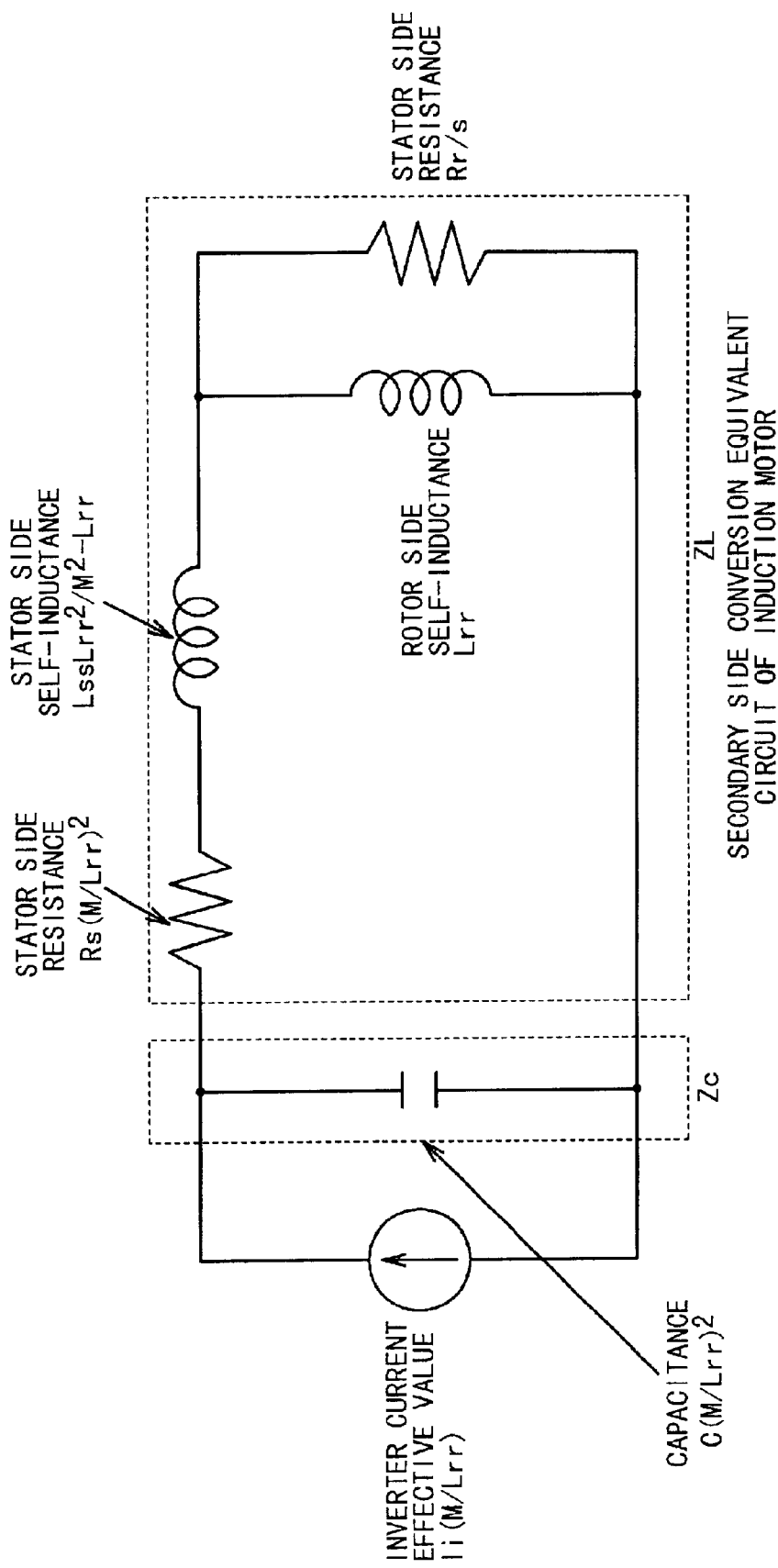
FIG. 4 is a secondary side conversion equivalent circuit of an induction motor and the inverter control apparatus according to the embodiment of the present invention.
Figure 5:
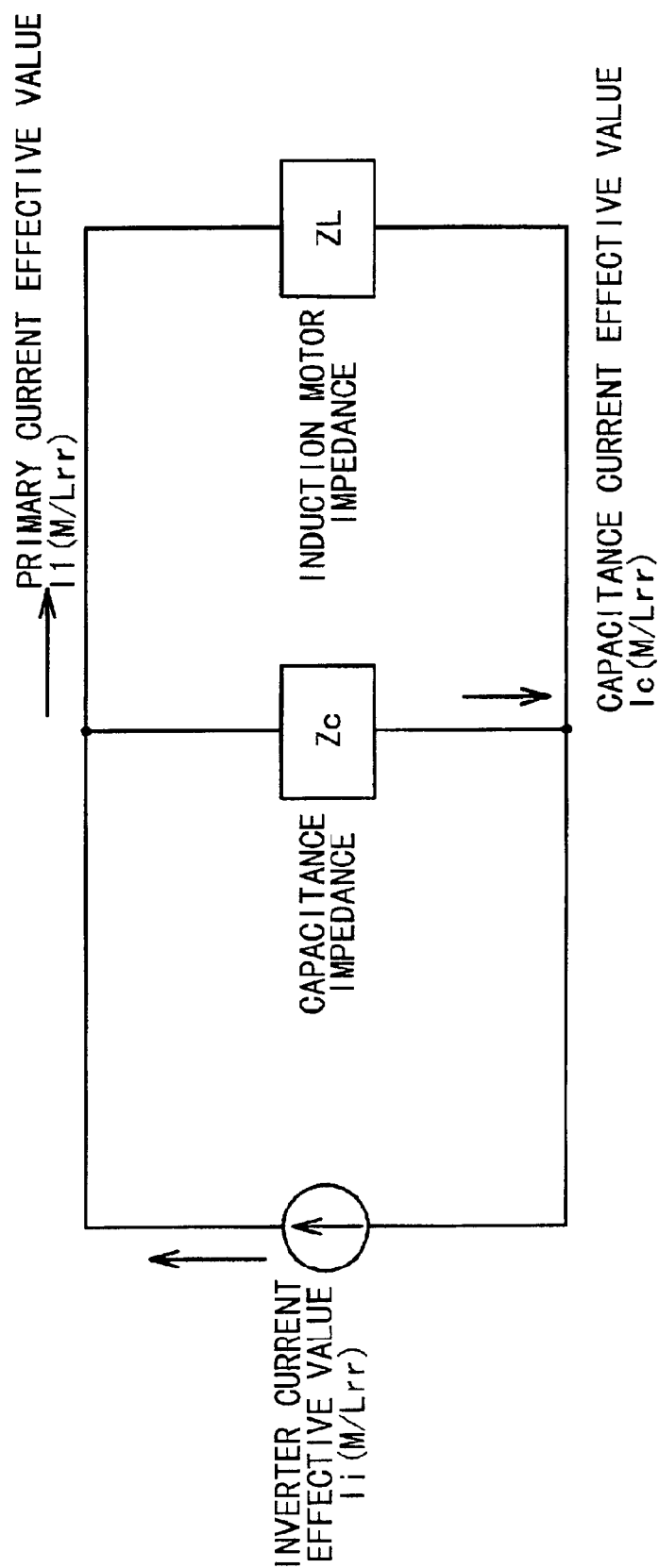
FIG. 5 is an equivalent circuit obtained by simplifying the equivalent circuit shown in FIG. 4.

First, the capacitor correction will be described. Originally, the capacitor 62c with a small capacitance is selected for the inverter 62. Therefore, it would be considered that the capacitor has no effect in the feedback system. In actuality, the effect of the capacitor 62c has been fully ignored. However, for the purpose of the more precious control of the stationary characteristics, it is important to consider the capacitor effect even in the feedback system. FIG. 4 is a secondary side conversion equivalent circuit of the induction motor 11 and the variable speed driving unit 60 with the effect of the capacitor 62c provided on the output of the inverter 62. FIG. 5 is a diagram showing an equivalent circuit when the equivalent circuit shown in FIG. 4 is more simplified.

Because there are the DC reactors 62a in front of the current type inverter 62, the impedance of the current type inverter 62 from the output side is large and the current type inverter 62 functions as a current source of an inverter current effective value Ii (M/Lrr).

In the equivalent circuit of FIG. 4, capacitor impedance Zc and induction motor impedance ZL are determined based on the following equations (8) and (9).

$$Zc = 1/(j\omega eC(M/Lrr)^2) \quad (8)$$

$$ZL = Rs(M/Lrr)^2 + j\omega e(LssLrr^2/M^2 - Lrr) + (j\omega eLrr \cdot Rr/S)/(j\omega eLrr + Rr/S) \quad (9)$$

It would be found from the equivalent circuit shown in FIG. 5 that it is sufficient to correct for the inverter current flowing into the capacitor impedance Zc. The current effective value obtained by subtracting the capacitor current effective value (Ic(M/Lrr)) flowing into the capacitor impedance Zc from the inverter current effective value (Ii(M/Lrr)) in the inverter 62 is supplied as the primary current effective value (I1(M/Lrr)) to the induction motor 11. It is sufficient to consider a correction factor Kc [no dimension] as the capacitor correction when this effect is calculated using the following equation (10).

$$Idc^* = Kc \times Id^* \quad (10)$$

where

Id*: a rectifier current instruction signal [A],

Idc*: a rectifier current instruction signal after the correction [A], and

Kc: a correction factor.

The correction factor Kc is represented by the following equation (11).

$$Kc = ((k1 - k2)^2 + k3^2)^{1/2} \quad (11)$$

where $k1 = 1 - \omega e^2 \cdot C(Lss - M^2/Lrr)$, $k2 = (\omega e^2 \cdot C(Rr/S)^2 \cdot M^2/Lrr)/((\omega e \cdot Lrr)^2 + (Rr/S)^2)$ $k3 = \omega e \cdot C \cdot Rs + (\omega e^3 \cdot C(Rr/S)M^2)/((\omega e \cdot Lrr)^2 + (Rr/S)^2)$, ωe: inverter angular frequency $(= fe^* \times 2\pi)$ [rad/s], C: a capacitance of the capacitors [F], Lss: a self-inductance on the side of the induction motor stator [H], M: a mutual inductance between the stator and rotor in the induction motor [H], Lrr: self-inductance on the side of the induction motor rotor [H], Rs: resistance on the side of the induction motor stator [Ω], Rr: resistance on the side of the induction motor rotor [Ω], and S: slide [no dimension].

Also, seen from the above equation (11), the correction factor Kc could be rewritten by the following equation (12), when the capacitance is represented by C, if A, B, and D are appropriately selected.

$$Kc = D^{1/2}\{1-(AC+BC^2)\}^{1/2} \quad (12)$$

In this case, when capacitance C is enough small, $$Kc = D^{1/2}(1-(1/2)(AC+BC^2)) \quad (13)$$

(2) PWM Correcting Section 72

Because the inverter is generally operated in a PWM (pulse width modulation) mode, the current waveform contains a basic inverter frequency component and other frequency components. Therefore, it is possible to carry out correction of the control of the basic frequency component in the PWM mode by using the following equation (14), if a reciprocal of the ratio of the basic inverter frequency component is used as a correction factor Kp. For example, the reciprocal is 1/0.9 when the ratio of the basic inverter frequency component is 90%.

$$Idcp^* = Kp \times Idc^* \quad (14)$$

where

Kp: PWM correction factor [no dimension], and

Idcp*: current instruction signal after the correction [A]

It should be noted that both of the capacitor correction and the PWM correction are described. However, instead of carrying out both, either one may be carried out. The inverter control unit 90 may be composed of both of the capacitor correcting section 71 and the PWM correcting section 72 or may be composed of either of the capacitor correcting section 71 or the PWM correcting section 72. When only the capacitor correction is carried out, the rectifier current instruction signal Idc* is outputted from the capacitor correcting section 71 to the rectifier 61, just as it is. When only the PWM correction is carried out, the current instruction signal Id* is outputted from the current calculating section 25 to the PWM correcting section 72. A product of the current instruction signal Id* and the above correction factor Kp is outputted to the rectifier 61 as the rectifier current instruction signal Idcp*.

By carrying out this control, the stationary characteristics of the inverter, i.e., the effective value of the voltage or current can be improved.

According to the inverter control apparatus of the present invention, the stationary characteristics can be improved, because the effect of the output stage of the inverter is considered.

What is claimed is:

1. A motor driving system for driving an induction motor with a rotation frequency detector, wherein said induction motor drives a load, and said rotation frequency detector detects a rotation frequency of said induction motor, comprising:

a variable speed driving unit connected to said induction motor and having a capacitance at its output, wherein said variable speed driving unit rectifies first 3-phase AC power to produce DC power, and converts the DC power into second 3-phase AC power with a frequency, and drives said induction motor with the second 3-phase AC power; and an inverter control unit which generates a frequency instruction and a temporary current instruction based on said detected rotation frequency and a rotation frequency instruction at least, corrects said temporary current instruction based on at least one of first correction depending on a value of said capacitance and second correction depending on a predetermined frequency component of said temporary current instruction to produce a current instruction, and controls said variable speed driving unit based on said frequency instruction and said current instruction.

2. The motor driving system according to claim 1, wherein said variable speed driving unit comprises:

a rectifying unit which rectifies the first 3-phase AC power in response to said current instruction to produce the DC power; and a current type inverter having said capacitance at the output, wherein said current type inverter converts the DC power into the second 3-phase AC power with the frequency in response to said frequency instruction.

3. The motor driving system according to claim 1, wherein said inverter control unit comprises:

a first correcting section which corrects said temporary current instruction for current flowing into said capacitance in said first correction to produce said current instruction.

4. A motor driving system for driving an induction motor with a rotation frequency detector, wherein said induction motor drives a load, and said rotation frequency detector detects a rotation frequency of said induction motor, comprising:

a variable speed driving unit connected to said induction motor and having a capacitance at its output, wherein said variable speed driving unit rectifies first 3-phase AC power to produce DC power, and converts the DC power into second 3-phase AC power with a frequency, and drives said induction motor with the second 3-phase AC power; and an inverter control unit which generates a frequency instruction and a temporary current instruction based on said detected rotation frequency and a rotation frequency instruction at least, corrects said temporary current instruction based on at least one of first correction depending on a value of said capacitance and second correction depending on a predetermined frequency component of said temporary current instruction to produce a current instruction, and controls said variable speed driving unit based on said frequency instruction and said current instruction, wherein said inverter control unit comprises:

a first correcting section which corrects said temporary current instruction for current flowing into said capacitance in said first correction to produce said current instruction, wherein said first correcting section corrects said temporary current instruction based on a first correction factor to produce said current instruction, and wherein said first correction factor is determined based on said capacitor, a self-inductance of a stator of said induction motor stator, a mutual inductance between the stator and a rotor in said induction motor, a self-inductance of the rotor of the induction motor, a resistance of the stator of the induction motor, a resistance of the rotor of the induction motor rotor, and slide.

5. The motor driving system according to claim 1, wherein said inverter control unit comprises:
a second correcting section which corrects said temporary current instruction based on a second correction factor in said second correction to produce said current instruction, wherein said second correction factor is determined such that said predetermined frequency component is set to a predetermined value.

6. The motor driving system according to claim 1, wherein said inverter control unit comprises:
a first correcting section which corrects said temporary current instruction for current flowing into said capacitance in said first correction to produce a next temporary current instruction; and
a second correcting section which corrects said next temporary current instruction based on a second correction factor in said second correction to produce said current instruction, wherein said second correction factor is determined such that said predetermined frequency component is set to a predetermined value.

7. A motor driving system for driving an induction motor with a rotation frequency detector, wherein said induction motor drives a load, and said rotation frequency detector detects a rotation frequency of said induction motor, comprising:
a variable speed driving unit connected to said induction motor and having a capacitance at its output, wherein said variable speed driving unit rectifies first 3-phase AC power to produce DC power, and converts the DC power into second 3-phase AC power with a frequency, and drives said induction motor with the second 3-phase AC power; and
an inverter control unit which generates a frequency instruction and a temporary current instruction based on said detected rotation frequency and a rotation frequency instruction at least, corrects said temporary current instruction based on at least one of first correction depending on a value of said capacitance and second correction depending on a predetermined frequency component of said temporary current instruction to produce a current instruction, and controls said variable speed driving unit based on said frequency instruction and said current instruction,
wherein said inverter control unit comprises:
a first correcting section which corrects said temporary current instruction for current flowing into said capacitance in said first correction to produce a next temporary current instruction; and
a second correcting section which corrects said next temporary current instruction based on a second correction factor in said second correction to produce said current instruction,
wherein said second correction factor is determined such that said predetermined frequency component is set to a predetermined value,
wherein said first correcting section corrects said temporary current instruction based on a first correction factor to produce said next temporary current instruction, and
wherein said first correction factor is determined based on said capacitor, a self-inductance of a stator of said induction motor stator, a mutual inductance between the stator and a rotor in said induction motor, a self-inductance of the rotor of the induction motor, a resistance of the stator of the induction motor, a resistance of the rotor of the induction motor rotor, and slide.

8. An inverter control apparatus for controlling a variable speed driving unit which rectifies first 3-phase AC power to produce DC power, and converts the DC power into second 3-phase AC power with a frequency to drive an induction motor, comprising:
a frequency instructing section which generates a torque instruction based on a rotation frequency of said induction motor and a rotation frequency instruction at least and controls the frequency of the second 3-phase AC power based on said torque instruction and the rotation frequency of said induction motor; and
a current instructing section which generates a temporary current instruction from said torque instruction, corrects said temporary current instruction based on a value of capacitance and an impedance of said induction motor, and controls said variable speed driving unit based on said corrected current instruction, said variable speed driving unit having said capacitance at output connected to said induction motor.

9. The inverter control apparatus according to claim 8, wherein said current instructing section further corrects said corrected current instruction such that a predetermined frequency component of said corrected current instruction is set to a predetermined value.

10. An inverter control apparatus which outputs a control signal to a variable speed driving apparatus which drives an induction motor in a variable speed in response to said control signal, wherein said variable speed driving apparatus rectifies first 3-phase AC power to produce DC power, and converts the DC cower into second 3-phase AC power with a frequency, and drives said induction motor with the second 3-phase AC power, said inverter control apparatus comprising:
a control signal generating section which generates said control signal based on a value of capacitance at an output terminal set of said variable speed driving apparatus which is connected to said induction motor at the output terminal set.

11. The inverter control apparatus according to claim 10, wherein said control signal is determined based on parameters associated with a rotor and a stator of said induction motor.

12. A inverter control apparatus which outputs a control signal to a variable speed driving apparatus which drives an induction motor in a variable speed in response to said control signal, wherein said variable speed driving apparatus rectifies first 3-phase AC power to produce DC power, and converts the DC power into second 3-phase AC power with a frequency, and drives said induction motor with the second 3-phase AC power, said inverter control apparatus comprising:
a control signal generating section which generates said control signal based on a value of capacitance at an output terminal set of said variable speed driving apparatus which is connected to said induction motor at the output terminal set,
wherein said control signal is determined based on parameters associated with a rotor and a stator of said induction motor, and
wherein said control signal satisfies the following equation:

$$Idc^* = Kc \cdot Id^*$$

where
$Idc^*$: said control signal,
$Ld^*$: an auxiliary control signal to be outputted as said control signal when said capacitance is not considered,
$Kc$: a coefficient Kc determined based on a self-inductance of a stator of said induction motor, a mutual inductance between the stator and a rotor of said induction motor, a self-inductance of the rotor of said induction motor, a resistance of the stator of said induction motor, a resistance of the rotor of said induction motor, and a slide quantity.

13. The inverter control apparatus according to claim 10, wherein said control signal generating section generates said control signal to compensate for a capacitor current flowing into said capacitance.

14. An inverter control apparatus which outputs a control signal to a variable speed driving apparatus which drives an induction motor in a variable speed in response to said control signal, wherein said variable speed driving apparatus rectifies first 3-phase AC power to produce DC power, and converts the DC power into second 3-phase AC power with a frequency, and drives said induction motor with the second 3-phase AC power, said inverter control apparatus comprising:

a control signal generating section which generates said control signal based on a value of capacitance at an output terminal set of said variable speed driving apparatus which is connected to said induction motor at the output terminal set, and wherein said control signal generating section generates said control signal based on a frequency instruction signal to instruct a frequency of an output of said variable speed driving apparatus, a self-inductance of a stator of said induction motor, a mutual inductance between said stator and a rotor in said induction motor, a self-inductance of said rotor of said induction motor, a resistance of said stator of said induction motor, a resistance of said rotor of said induction motor, a slide quantity of said induction motor, in addition to said capacitance.

15. An inverter control apparatus which outputs a control signal to a variable speed driving apparatus which drives an induction motor in a variable speed in response to said control signal, wherein said variable speed driving apparatus rectifies first 3-phase AC power to produce DC rower, and converts the DC power into second 3-phase AC power with a frequency, and drives said induction motor with the second 3-phase AC power, said inverter control apparatus comprising:

a control signal generating section which generates said control signal based on a frequency component contained in an input signal and a remaining frequency component of said input signal.

16. The inverter control apparatus according to claim 15, wherein said control signal generating section multiplies said input signal and a reciprocal of a ratio of said frequency component to said input signal and generates said control signal based on the multiplication result.

17. An inverter control apparatus which outputs a control signal to a variable speed driving apparatus which drives an induction motor in a variable speed in response to said control signal, comprising:

a capacitor correction signal generating section which generates a capacitor correction signal based on a value of capacitance connected with an output terminal set of said variable speed driving apparatus; and a control signal generating section which generates said control signal based on an inverter frequency component contained in said capacitor correction signal and a remaining frequency component of said capacitor correction signal other than said inverter frequency component.

18. A motor driving system comprising:

a variable speed driving apparatus which supplies an AC control power generated based on a control signal to an AC motor to drive said AC motor in variable speed; and an inverter control apparatus which outputs said control signal to said variable speed driving apparatus, wherein said variable speed driving apparatus comprises:
a rectification section which rectifies AC power to generate DC power; and
an inverter section which generates said AC control power from said generated DC power, said inverter control apparatus generates said control signal based on a value of capacitance connected with an output terminal set of said variable speed driving apparatus, an inverter frequency component of an input signal and a remaining frequency component of said input signal other than said inverter frequency component, and outputs said control signal to said rectification section.

* * * * *